(12) United States Patent  (10) Patent No.: US 7,587,802 B2
Tsuchiya et al.  (45) Date of Patent: Sep. 15, 2009

(54) ROBOTIC VEHICLE PANEL ALIGNMENT SYSTEM AND PROCESS

(75) Inventors: Hiroki Tsuchiya, Dublin, OH (US); Scott Cavinee, Kenton, OH (US); Ross Cordell, Woodstock, OH (US); Greg Null, Richwood, OH (US)

(73) Assignee: Honda Motor Co., Ltd., Tokyo (JP)

( * ) Notice: Subject to any disclaimer, the term of this patent is extended or adjusted under 35 U.S.C. 154(b) by 687 days.

(21) Appl. No.: 11/202,873

(22) Filed: Aug. 12, 2005

(65) Prior Publication Data

US 2007/0033790 A1 Feb. 15, 2007

(51) Int. Cl.
*B23Q 17/00* (2006.01)
*B23Q 3/00* (2006.01)

(52) U.S. Cl. .................................. 29/407.01; 29/464

(58) Field of Classification Search .............. 29/407.01, 29/428–430, 791–795, 822–824, 407.09, 29/407.1, 464, 712, 714, 771, 783, 787, 897.2, 29/466, 468, 759, 760; 901/46, 30
See application file for complete search history.

(56) References Cited

U.S. PATENT DOCUMENTS

| 4,442,335 A | 4/1984 | Rossi |
| 4,527,685 A | 7/1985 | Welder |
| 4,609,000 A | 9/1986 | Noh et al. |
| 4,627,158 A * | 12/1986 | Mitoh ......................... 29/771 |
| 4,691,905 A | 9/1987 | Tamura et al. |
| 4,869,416 A | 9/1989 | Harada et al. |
| 4,894,901 A | 1/1990 | Soderberg |
| 5,005,277 A | 4/1991 | Uemura et al. |
| 5,010,226 A | 4/1991 | Sato et al. |
| 5,026,033 A | 6/1991 | Roxy |
| 5,103,551 A | 4/1992 | Tamura et al. |
| 5,216,800 A | 6/1993 | Nishigori |
| 5,249,785 A | 10/1993 | Nelson et al. |
| 5,406,697 A | 4/1995 | Busisi |
| 5,479,698 A | 1/1996 | Angel |

(Continued)

FOREIGN PATENT DOCUMENTS

DE  4113529 A1  11/1991

(Continued)

OTHER PUBLICATIONS

McGraw-Hill Dictionary of Scientific and Technical Terms, 2003, McGraw Hill, www.answers.com.*

(Continued)

*Primary Examiner*—John C Hong
(74) *Attorney, Agent, or Firm*—Standley Law Group LLP

(57) ABSTRACT

A robotic system and process for automatically orienting/positioning a vehicle panel prior to its installation to a vehicle. The panel is first moved by the robot from a temporary storage position to an alignment fixture that acts to initially define the orientation/position of the panel in two directions. The robot subsequently contacts the panel such that the panel is pushed against a position stop that defines the position of the panel in a third direction. With the panel properly oriented/positioned, the robot removes the panel from the alignment fixture and transfers it to the vehicle for installation. Panels of dissimilar size and/or shape may be installed using the same system and process.

30 Claims, 5 Drawing Sheets

U.S. PATENT DOCUMENTS

| | | |
|---|---|---|
| 5,522,128 A | 6/1996 | Sauve |
| 5,548,096 A | 8/1996 | Akasaka et al. |
| 5,711,647 A | 1/1998 | Slocum |
| 6,024,349 A | 2/2000 | Hoffmann et al. |

FOREIGN PATENT DOCUMENTS

| | | | |
|---|---|---|---|
| EP | 470939 A1 * | 2/1992 | |
| GB | 2238761 A | 6/1991 | |
| JP | 56103669 A | 8/1981 | |

OTHER PUBLICATIONS

American Heritage dictionary of the English Language, 2004, Houghton Mifflin, 4th Edition, dictionary.reference.com.*

* cited by examiner

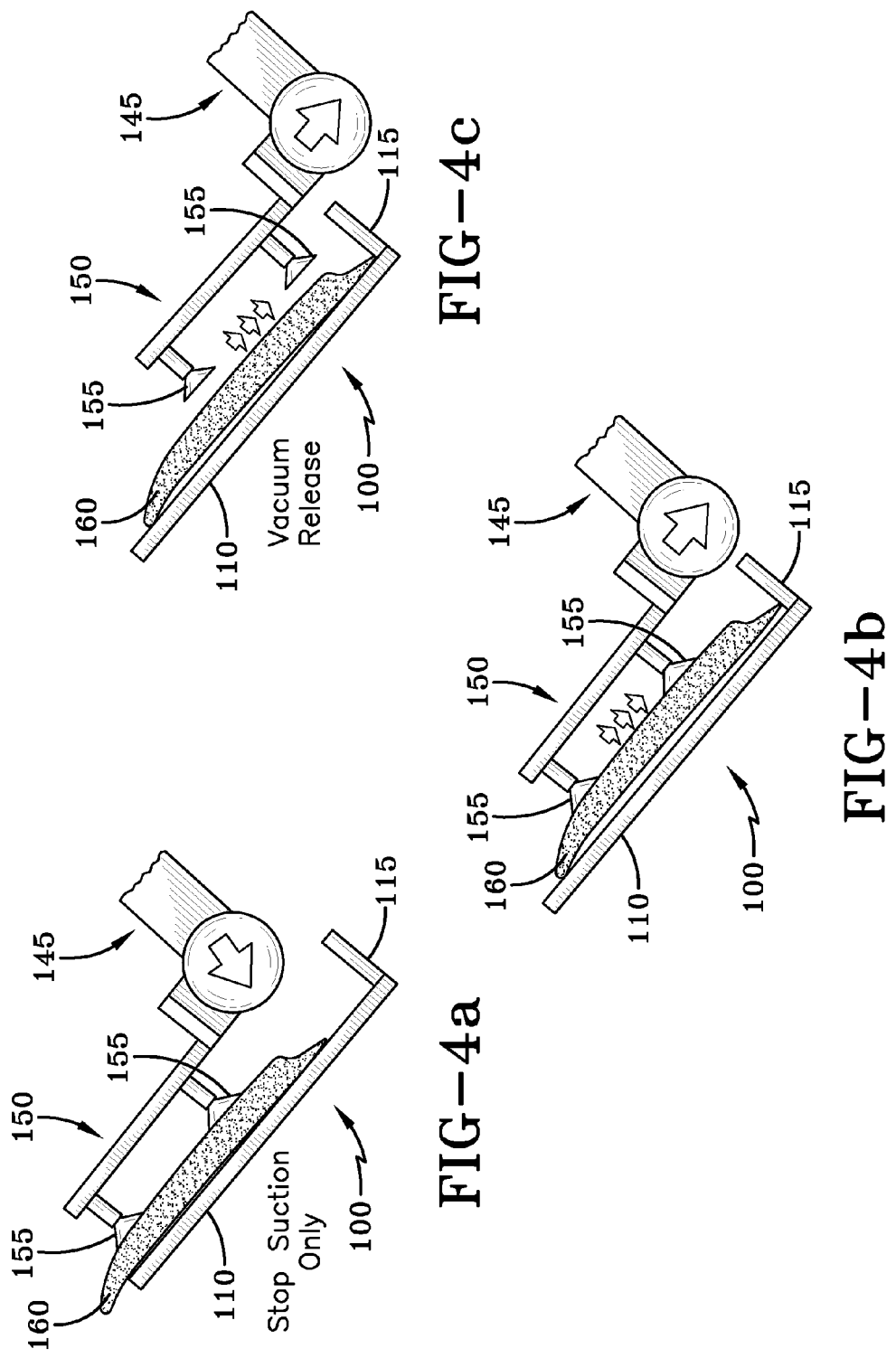

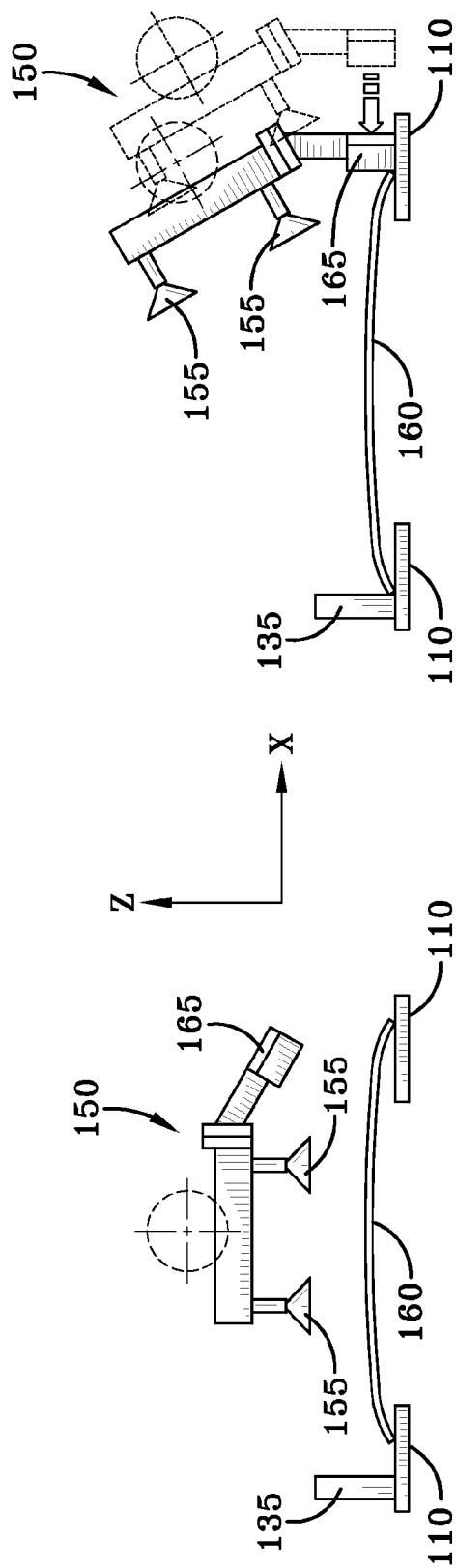

ROBOTIC VEHICLE PANEL ALIGNMENT SYSTEM AND PROCESS

BACKGROUND OF THE INVENTION

The present invention is directed to a robotic process for properly aligning a vehicle panel during a vehicle assembly process. More particularly, the present invention is directed to a robotic process whereby a vehicle panel can be removed from a temporary storage position, such as from a delivery cart, and properly oriented/positioned for robotic pickup and transfer to a vehicle.

Vehicle panels, such as hood skins, are typically delivered to an assembly line via some delivery system. Commonly such panels are delivered on carts that are designed to receive the panels in a delivery and unload section of the assembly plant, and to securely transport the panels to an assembly line where they will be used or installed to a vehicle. These carts may be automated or they may be transported to the desired location by workers using tow motors, tuggers, or various other driven vehicles.

The aforementioned carts are typically designed to ensure that a given panel, or plurality of panels, can be securely transported to a desired location without damage and without the risk of a panel falling from the cart. However, it is difficult to produce such a cart that can repeatedly guarantee the exact position of the panels upon arrival. Additionally, panels may be unloaded from these carts to a temporary storage position prior to use. Consequently, panels may await pickup in somewhat different positions and/or orientations.

Generally, then, it is necessary to reorient/reposition such panels prior to their installation to a vehicle. In other words, it is generally necessary to remove such a panel from a delivery cart or other temporary storage position and to place the panel in a particular orientation/position so that it can be properly transferred to a vehicle by a robot.

Reorientation may occur in a number of ways. For example, a worker may manually remove each panel from its initial temporary storage position and subsequently orient/position it for proper installation to a vehicle. This may be done with the aid of some sort of alignment jig or fixture that allows the worker to gauge the orientation of the panel. Alternatively, a panel may be manually or robotically removed from its initial temporary storage position and placed in an automated alignment fixture that functions to properly orient the panel.

One known version of a related automated fixture uses multiple actuators to properly position a component. More specifically, the fixture is provided with multiple actuators that are located to be located outward of the periphery of the component once it has been set into the fixture. Subsequent extension of the actuators thereafter results in contact with various sides of the component, eventually forcing it into the desired orientation and position. One or more hard stops or other contactors may be employed in certain embodiments of such fixtures to help guarantee position. Once properly positioned, the actuators may be retracted and the component can be picked up by a part installer and installed to the vehicle.

More simplistic embodiments of a part positioning fixture have attempted to use gravity as the driving force for properly orienting a panel. Such a fixture is usually designed with at least one angle, and may possess a compound angle that is provided to produce movement of the panel into proper position once it has been deposited to the fixture. Such a fixture also commonly includes one or more hard stops against which the panel can slide once deposited thereto.

Each of these known part orienting fixtures/systems suffers from various drawbacks, however. For example, the former actuator-employing fixture cannot generally accommodate panels of more than one size and or shape because supports designed for one panel may not correspond to the size and/or shape of a dissimilar panel. Further, the actuators are normally designed to contact corresponding portions of the panels only through a specific and predetermined distance. Thus, in certain circumstances, a panel of dissimilar size and/or shape may simply be too large to fit on the fixture. In other circumstances, it is possible that the movement of the actuators may be insufficient to fully move the panel into position. Even in the event that the actuator movement is adjustable, it is at least required to adjust the stop points thereof each time a new panel is loaded onto the fixture. Additionally, on embodiments employing hard stops, it may not be possible to locate Hard stops to accommodate more than one panel. As a result of these difficulties, it is typically necessary that a separate actuator-type fixture be designed for each panel of interest. Obviously, this is both space consuming and expensive—particularly when dealing with large panels.

The latter-mentioned and known gravity-based fixture/system has also proven to be unacceptable. First, it has been found that gravity alone is often sufficient to cause proper displacement of the component. More specifically, it has been observed that high frictional forces often exist between contacting portions of the panel and the fixture—particularly when the panel is of significant weight. The result of this problem is that the panel commonly fails to slide fully into the proper position. Further, such fixtures typically rely on momentum to assist with sliding of the panel. That is, the panel is often dropped on the fixture from some slight distance, thereby facilitating its movement. This has also proven to be problematic, as dropping of the panel often results in damage thereto (particularly if the panel is of significant weight).

Hence, what is desired is a system and process by which a panel can be removed from a delivery cart or other temporary storage position and quickly, easily and repeatably oriented/positioned for subsequent pickup and transfer by a robotic part installer. The system and process of the present invention satisfies this need. A system and process of the present invention can be used to properly orient/position a variety of different types of components, but is especially well suited for use with vehicle panels. The same system/process of the present invention may also be capable of use with various sized and shaped panels of a particular type (e.g., hood skins).

SUMMARY OF THE INVENTION

The present invention is directed to a system and process for properly orienting/positioning vehicle panels, such as vehicle hood skins, prior to robotic pickup and installation to a vehicle. However, it should be understood by one skilled in the art that the system and process of the present invention may have application to any number of vehicle components.

Once a panel is delivered to the assembly line or other location in a facility where the panel will be used or otherwise installed, the panel must be removed from its temporary storage position (e.g., delivery cart), properly oriented/positioned, and subsequently removed from an orienting/positioning means and installed to a vehicle.

The present invention contemplates that each of removal of the panel from the temporary storage position, placement of the panel into an orienting/positioning means, and subsequent removal and installation of the panel will be accomplished robotically. Such robots would be well known to one skilled in the art and need not be described in detail herein. However, for specificity, it should be noted that at least one embodiment of the present invention makes use of a robot having a suction cup/vacuum part handling system.

A system of the present invention generally includes at least one part handling robot equipped to grasp a panel, and an alignment fixture designed to receive the panel from the part handling robot and to allow the panel to be consistently and properly oriented/positioned for subsequent removal and installation to a vehicle. More than one part handling robot may be used. Preferably, however, a single part handling robot is positioned so that it can remove the panel from its temporary storage position, place the panel on the alignment fixture, and subsequently remove and install the panel to a vehicle.

Preferably, but not necessarily, the alignment fixture is provided with a compound angle that acts to retain and orient the panel on the fixture while simultaneously facilitating movement of the panel into proper position for pickup and installation. In one exemplary embodiment, the alignment fixture is angled rearward from vertical as well as to the left from center. Certainly, other configurations are also possible.

The alignment fixture is preferably also provided with one or more supports/stops against which the panel is pressed. For example, with respect to the particular configuration described above, there is preferably a rear and bottom support/stop that act together to initially define the orientation and position of the panel in two directions. An additional position stop allows the position of the panel to be defined in a third direction. One or more sensors may also be provided to indicate to a worker and/or the robot that the panel has achieved the proper orientation/position.

The part handling robot may be adapted to grasp the panel in a number of ways. Preferably, however, the robot is provided with one or more suction cups that are connected to the suction generating device of a vacuum system. This method allows the robot to pick up a variety of panels without requiring modification, and grasping and release functions can be controlled by simply producing or releasing suction.

The robot is also preferably equipped with a pushing element. Once the panel has been placed on the alignment fixture and released, the robot uses the pushing element to move the panel into position against the position stop(s) associated with the alignment fixture. Once the panel is fully and properly positioned on the alignment fixture, the robot re-grasps the panel, removes it from the alignment fixture, and transfers it to a vehicle.

The process of orienting/positioning and transferring a panel to a vehicle according to the present invention also includes a novel method of ensuring that the panel is placed onto the alignment fixture without causing damage to the panel. To this end, the point at which the robot releases suction and then moves the suction cup(s) away from the panel is carefully controlled to produce a smooth and gentle placement of the panel on the alignment fixture.

Therefore, as can be understood from the foregoing description, the system and process of the present invention allows for panels to be quickly, easily, and repeatably removed from a temporary storage position and placed in a proper orientation/position for subsequent removal and transfer to a vehicle. The present invention enables a single robot and alignment fixture to work with panels of dissimilar size and shape. Consequently, the system and process of the present invention can also save valuable floor space and resources in comparison to known alignment systems.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 4a-4c comprise a schematic representation of the process used to robotically place a vehicle panel onto an alignment fixture according to the present invention; and FIGS. 5a-5c comprise a schematic representation of the process used to move a vehicle panel into proper position upon a vehicle panel alignment fixture according to the present invention.

DETAILED DESCRIPTION OF THE EXEMPLARY EMBODIMENT(S)

Figure 1:
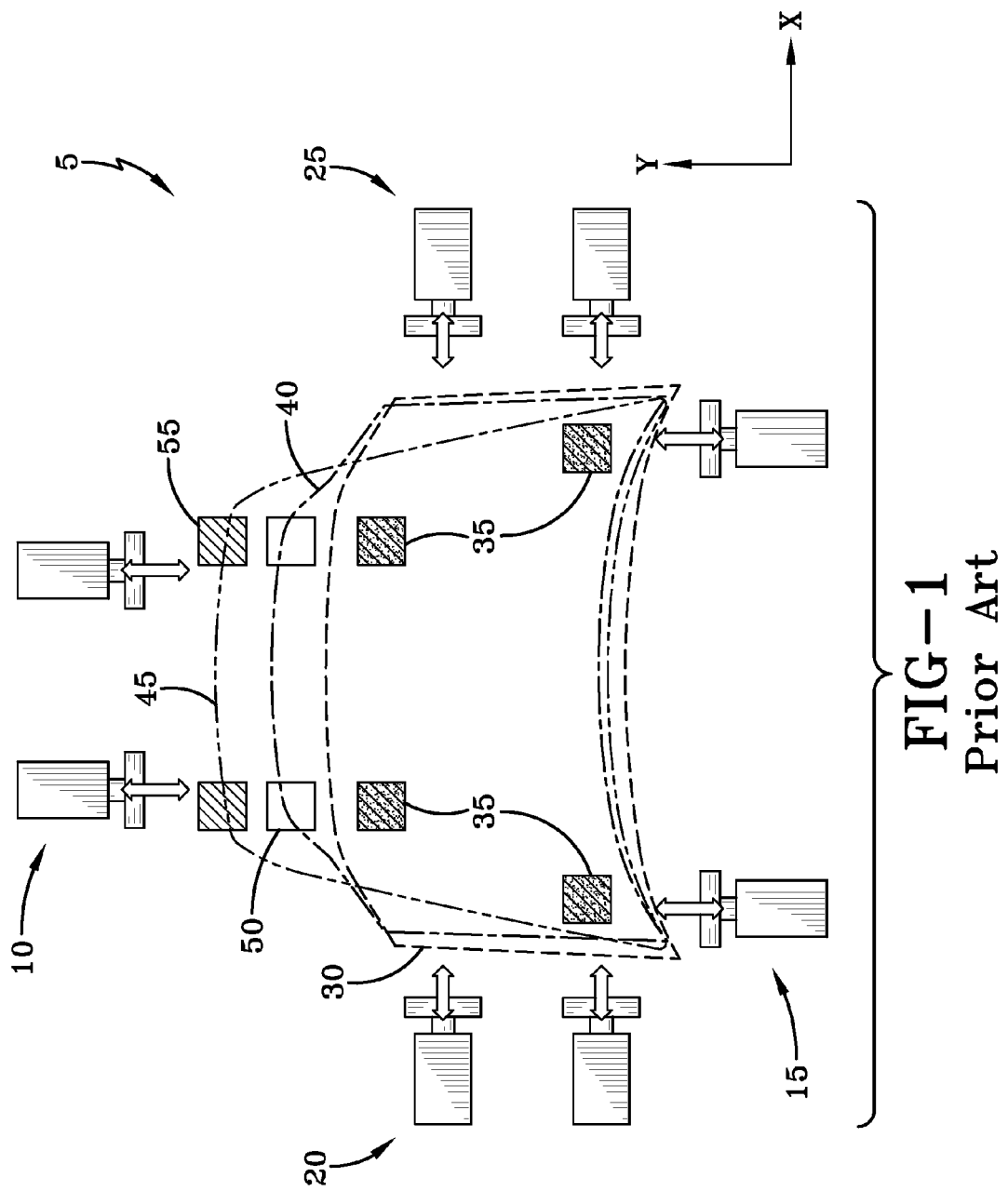
FIG. 1 is a top plan view of a known vehicle panel alignment fixture.

A known vehicle panel alignment fixture 5 is shown in the top plan view of FIG. 1. Such fixtures may exist to orient/position a variety of panels, but in the particular exemplary embodiment of FIG. 1, the fixture is used to orient/position a vehicle hood skin 30. The fixture may make use of a number of panel supports 35 or even a form fitting part "nest" to receive the hood skin—although such is not shown in detail in FIG. 1 for reasons of clarity.

As shown, the alignment fixture 5 includes a number of actuator pairs 10, 15, 20, 25 that are used to manipulate the hood skin 30 once it has been placed on the fixture 5. The opposing actuator pairs 10, 15 located at the top and bottom of the vehicle hood skin 30 are used to move the hood skin along the "Y" axis as indicated by the like-labeled arrow. Similarly, opposing actuator pairs 20, 25 located at the left and right sides of the vehicle hood skin 30 are used to move the hood skin along the "X" axis as indicated by the like-labeled arrow. As such, once the actuator pairs have been properly extended, the hood skin should be properly positioned.

As can be seen, however, when a hood skin of different size and/or shape 40, 45 is placed on the fixture 5, it can be required to install additional component supports 50, 55 in order to accommodate the change in size and/or shape. Further, it is obvious that if actuators of fixed stroke length are used, at least certain ones thereof will not be capable of extending sufficiently to properly position the hood skin 45. At the very least, new stroke length hard stops would need to be set for virtually every actuator. Even if possible, given the dissimilarities in size and/or shape of the various hood skins of interest, such a process would be, at a minimum, tedious and time consuming. Consequently, more often than not it is necessary to build a separate actuator-based fixture for each vehicle hood skin (or other vehicle component) to be processed.

The system and process of the present invention alleviates this problem. One embodiment of an alignment fixture 100 according to the present invention can be observed in FIGS. 2-3. As can be seen, the fixture 100 comprises a framework 105 that includes rear and bottom component supports/stops 110, 115, respectively. each of the rear and bottom supports/ stops 110, 115 may be formed from multiple separate portions, or may be formed as a single solid surface.

Figure 2:
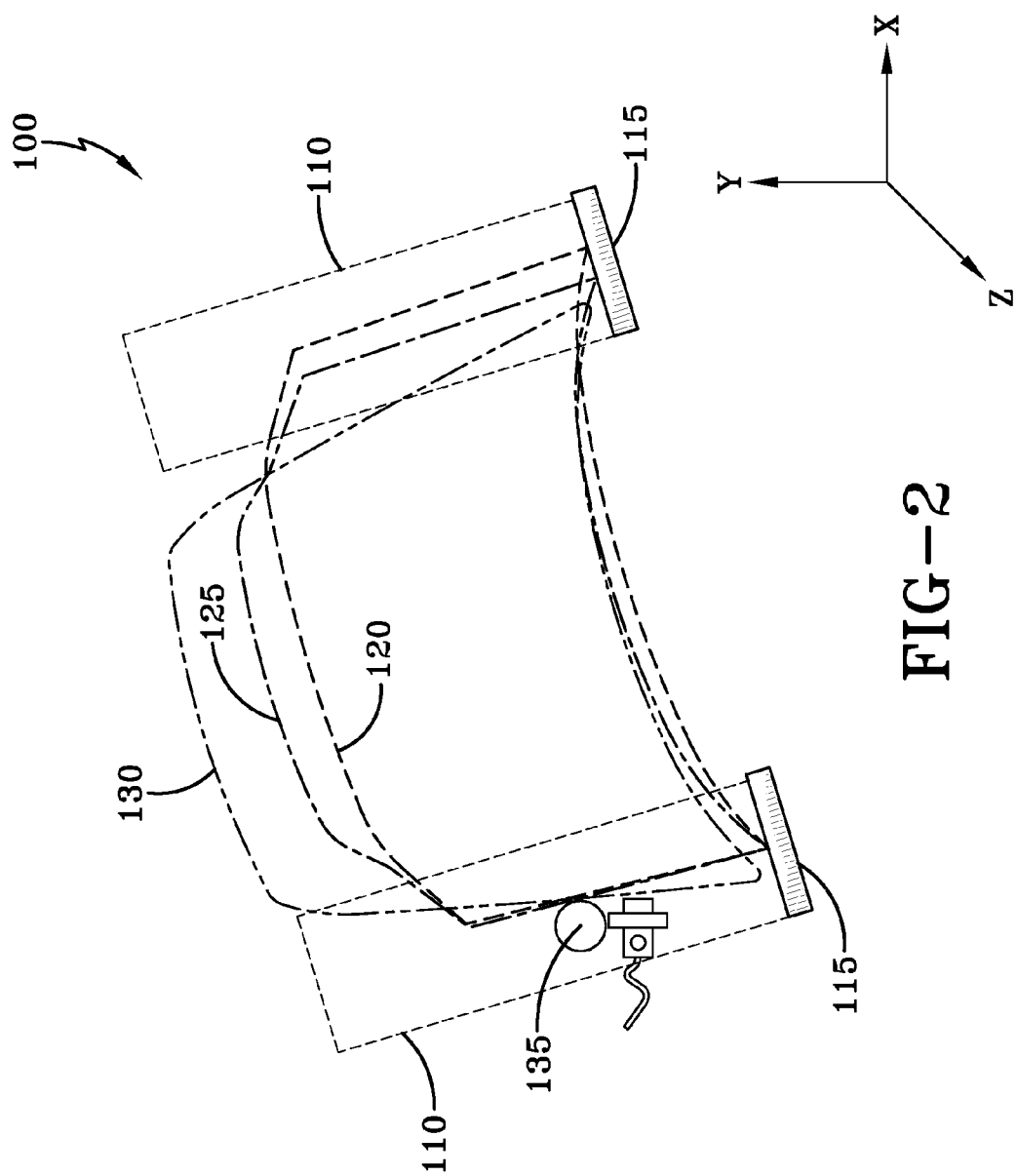
FIG. 2 is a front view of one embodiment of a vehicle panel alignment fixture of the present invention.
Figure 3:
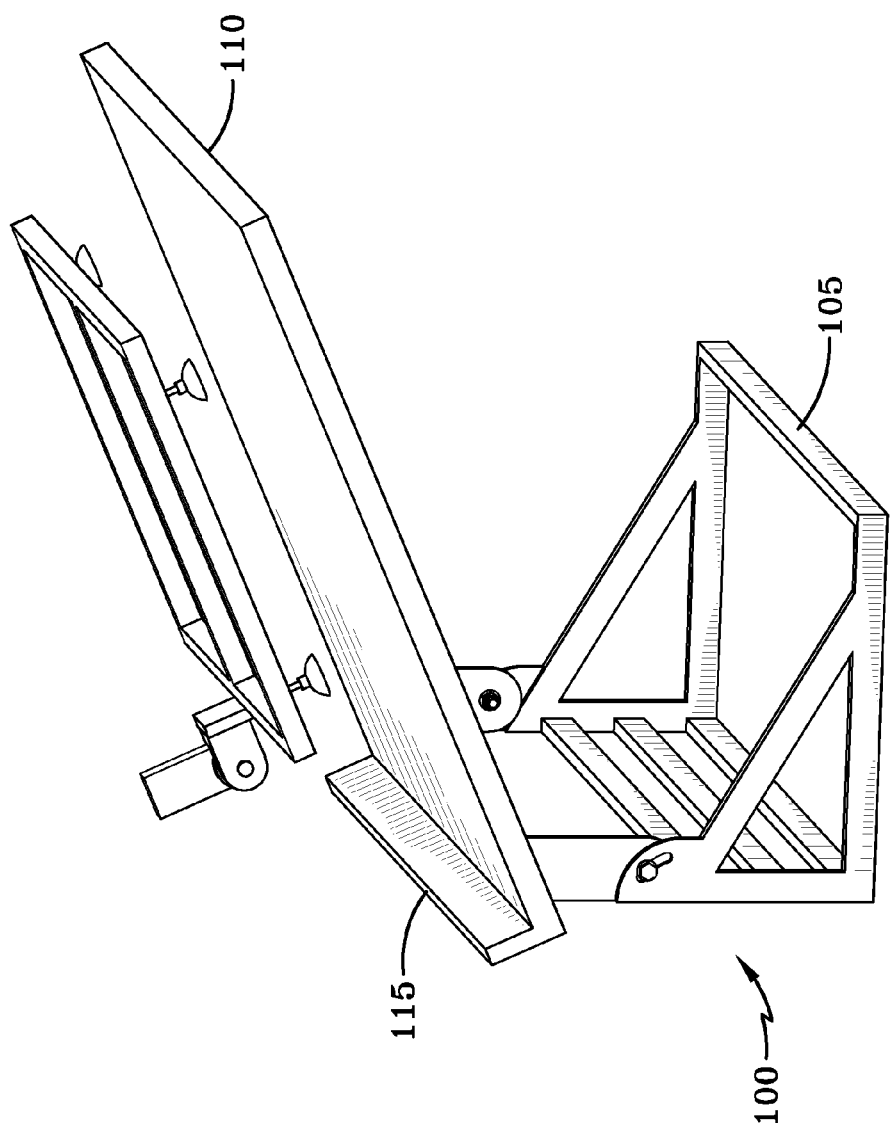
FIG. 3 is a side view of the alignment fixture of FIG. 2.

As can be understood from a combined viewing of FIGS. 2-3, the fixture 100 forms a compound angle. This angle may be fixed, or may be adjustable. More particularly, the rear and bottom supports/stops 110, 115 are inclined backward with respect to vertical, and are also tilted toward one side—in this case, the left side. The compound angle formed by the supports/stops 110, 115 allows a vehicle panel placed thereon to be supported against tipping while being simultaneously encouraged to slide in a predetermined direction (i.e., downward and to the left in this embodiment). While the present invention may be used with respect to a variety of vehicle panels, for purposes of simplicity and clarity, a hood skin 120, 125, 130 is specifically shown and described hereafter.

In this particular embodiment of the fixture 100, the rear support/stop 110 contacts and supports an underside of the hood skin, while the bottom support/stop 115 contacts and supports a rear portion of the hood skin. Thus, the support/stops 110, 115 act to initially define the orientation/position of the hood skin in two directions.

Preferably, a positioning stop 135 is provided to limit the travel of each hood skin placed on the fixture 100 and to thereby guarantee its location in a third direction. That is, with the supports/stops 110, 115 supporting and determining the position of the underside ("Z" direction) and rear ("Y" direction) of the hood skin, respectively, the positioning limit movement in the third ("X") direction, and thus serves to guarantee that each hood skin loaded onto the fixture will always attain a repeatable final orientation/position. Although not essential, a position sensor 140 may be employed to guarantee that the hood skin has reached the desired position against the position stop 135.

The process of orienting/positioning the hood skin according to the present invention includes initially removing the hood skin from a temporary storage position, such as from a delivery cart. Such delivery carts would be well known to one skilled in the art and are, therefore, not specifically shown or described herein.

Various known part handling robots may be used to remove the hood skin from its temporary storage position and to place it on the alignment fixture 100. One embodiment of such a part handling robot 145 can be seen in FIG. 3, although other types may also be used. Preferably, the robot is located such that it can adequately reach the location of both the temporary storage position and the alignment fixture 100.

In this particular embodiment of the present invention, the robot employs an end effector 150 (see FIGS. 4a-4c) that includes a jig equipped with one or more suction cups 155. The suction cups 155 are connected to a suction generating device that allows the robot to pick up and move the hood skins. Such systems are widely available and would be understood by one skilled in the art.

The specific process of the present invention by which the robot places a hood skin on the alignment fixture 100 is schematically represented in FIGS. 4a-4c. In a previous step, the robot will have moved into position against the hood skin 160 while the hood skin resides in its temporary storage position, and will have grasped the hood skin by creating suction/vacuum within the suction cups 155. As depicted in FIG. 4a, once sufficient suction has been generated, the robot 145 removes the hood skin 160 from its temporary storage position and moves it into an initial loading position on the alignment fixture 100.

Once the robot 145 has positioned the hood skin 160 against the rear support/stop 110 of the alignment fixture 100, suction generation is terminated. However, because the robot 145 may be pressing the hood skin 160 slightly against the rear support/stop 110 and/or because a vacuum will still exist within each suction cup 155, the robot continues to have a grasp on the hood skin.

Once suction generation has been terminated, the robot 145 slides the hood skin 160 toward the bottom support/stop 115 while still maintaining a grasp on the hood skin via the vacuum within each suction cup 155. The robot 145 continues to move the hood skin 160 in this direction until the hood skin has made positive contact with the bottom support/stop 115. Because suction generation has been terminated, the robot 145 is able to maintain a sufficiently strong grasp on the hood skin to allow for its controlled movement toward the bottom support/stop 115. However, the vacuum remaining within the suction cups 155 is also weak enough to permit the suctions cups to slide along the surface of the hood skin 160 as robot movement continues past the point of contact between the hood skin and the bottom support/stop 115. In this manner, it can be ensured that the hood skin 160 will be positively located against the bottom support/stop 115, but that no damage will be done to the hood skin by excessively forcing it against the bottom support/stop.

Positive location of the hood skin 160 against the bottom support/stop 115 may optionally be indicated by a sensor (not shown), which may be similar to the sensor 140 shown in FIG. 2. However, positive contact can likely be assured by simply causing the robot 145 to move some predetermined distance past the estimated point of contact between the hood skin 160 and the bottom support/stop 115, whereafter the suction cups 155 will simply slide along the surface of the hood skin 160.

Once it has been determined or otherwise reasonably guaranteed that the hood skin 160 has achieved positive contact with the bottom support/stop 115, the robot 145 moves the end effector 150 and the attached suction cups 155 away from the hood skin—thereby releasing the vacuum existing between it and the suction cups. The robot 145 may then move into position for the next step of the orientation/positioning process, or may perform one or more other ancillary tasks prior thereto.

The above-described component placement process is believed to be in contrast to a typical robotic part placement process, wherein a component is generally placed against a portion of a fixture and released to fall or slide under its own weight against a stop. As this known method also tends to cause defects to the component due to the forceful contact between the component and the fixture, the process of the present invention also generally improves the quality of the installed components.

With the hood skin 160 now in proper position against both the rear and bottom supports/stops 110, 115, the robot 145 moves into position to positively locate the hood skin against the positioning stop 135 shown in FIG. 2. This process is schematically depicted in FIGS. 5a-5c. It should be noted that FIGS. 5a-5c represent a bottom view of the alignment fixture 100, with the bottom support/stop 115 removed for clarity.

As illustrated in FIG. 5a, the robot 145 has moved the end effector 150 and associated suction cups 155 away from the hood skin 160. As can be seen more clearly in the view of FIGS. 5a-5c, the end effector 150 is also provided with a pushing element 165 that is designed to allow the robot 145 to use the end effector to slide the hood skin 160 in the "X" direction along the alignment fixture 100. In other embodiments of the present invention the pushing element 165 may be attached to the robot 145 by a means other than the end effector 150.

As depicted in FIG. 5b, the robot 145 manipulates the end effector 150 into a position wherein the pushing element 165 is in contact with the edge of the hood skin 160. Once in position, the robot 145 then uses the pushing element 165 to slide the hood skin 160 along the alignment fixture 100 until the edge of the hood skin makes positive contact with the position stop 135. The sensor 140 may be used to indicate positive contact and to signal the robot 145 to stop pushing against the hood skin. Alternatively, the robot 145 and/or the end effector 150 could be equipped with a force sensor or other device that accurately indicates positive contact between the hood skin 160 and the position stop 135. In any event, it is preferable, but not essential, that some indicating means be provided in order to avoid subjecting the hood skin 160 to excessive force.

Upon the hood skin 160 being properly pushed against the positive stop 135 by the robot 145, the hood skin will have fully achieved the desired orientation/position. Thus, the robot 145 next moves the end effector 150 away from the hood skin 160 and readies the end effector for removing the hood skin from the alignment fixture 100. During this process (not shown), the suction cups 155 of the end effector are again placed in contact with the surface of the hood skin 160 and suction is generated by the suction generating device. Once sufficient suction has been generated, the robot 145 removes the hood skin 160 from the alignment fixture 100 and moves it to a vehicle for installation thereto. Obviously, other operations may be performed on the hood skin 160 subsequent to its removal from the alignment fixture 100 and prior to its installation to the vehicle.

Referring back to FIG. 2, it can be observed that the system and process of the present invention allows vehicle panels to be repeatably located to the same orientation/position on the alignment fixture 100. Consequently, the robot 145 is consistently able to contact a vehicle panel, such as the hood skin 160 shown, at the same location during the removal process—thereby ensuring that the vehicle panel will be in the proper position for installation to the vehicle.

It can also be seen that vehicle panels of various shape and size may be placed on the alignment fixture 100 and moved to a common and repeatable position. More specifically, in conjunction with the rear and bottom supports/stops 110, 115, use of the position stop 135 allows for a point of contact along the edge of each panel loaded onto the alignment fixture 100 and positioned by the robot 145. This common point of contact can be best observed in FIG. 2, with reference to the hood skin shown.

While certain embodiments of the present invention are described in detail above, the scope of the invention is not to be considered limited by such disclosure, and modifications are possible without departing from the spirit of the invention as evidenced by the following claims:

What is claimed is:

1. A vehicle panel alignment process, comprising:
   providing an alignment fixture for receiving a vehicle panel;
   locating a robot to move said panel between a temporary storage position, said alignment fixture, and a vehicle to which said panel is to be installed;
   once deposited to said alignment fixture by said robot, using a pushing element attached to said robot to allow said robot to move said panel against a position stop of said alignment fixture, thereby ensuring the position of said panel; and
   using said robot to move said panel from said alignment fixture to said vehicle.

2. The process of claim 1, wherein said alignment fixture is set at a compound angle.

3. The process of claim 2, wherein said alignment fixture is tilted rearward with respect to vertical and also to one side.

4. The process of claim 1, wherein said alignment fixture includes a rear support/stop and a bottom/support stop that act to define the orientation/position of said panel in two directions when said panel is initially placed on said alignment fixture.

5. The process of claim 1, further comprising an end effector attached to said robot and provided to grasp said panel, said end effector including at least one suction cup in communication with a suction generating device.

6. The process of claim 5, wherein after said robot places said panel against said rear support/stop of said alignment fixture, suction generation is terminated, but said at least one suction cup remains slidably affixed to said panel via a vacuum existing therebetween.

7. The process of claim 6, further comprising moving said robot and said panel toward said bottom support/stop at least until a corresponding portion of said panel makes contact therewith.

8. The process of claim 7, further comprising subsequently releasing said vacuum between said at least one suction cup and said panel.

9. The process of claim 1, further comprising a sensor for indicating when said panel has made contact with said position stop.

10. The process of claim 1, wherein said temporary storage position comprises a delivery cart.

11. The process of claim 1, wherein said vehicle panel comprises a hood skin.

12. A process for orienting/positioning a vehicle panel prior to its robotic installation to a vehicle, comprising:
   providing an alignment fixture for receiving a vehicle panel, said alignment fixture having supports/stops that initially define the orientation/position of a panel in two directions when said panel is initially placed on said alignment fixture;
   locating a robot to move said panel between a temporary storage position, said alignment fixture, and a vehicle to which said panel is to be installed;
   attaching an end effector to said robot, said end effector adapted to grasp said panel by using one or more suction cups in communication with a suction generating device;
   once deposited to said alignment fixture by said robot, using a pushing element attached to said robot to subsequently move said panel against a position stop of said alignment fixture, thereby ensuring the position of said panel in a third direction; and
   using said robot to remove said panel from said alignment fixture and install it to said vehicle.

13. The process of claim 12, wherein said alignment fixture is set at a compound angle.

14. The process of claim 13, wherein said alignment fixture is tilted rearward with respect to vertical and also to one side.

15. The process of claim 12, wherein said supports/stops include a rear support/stop and a bottom/support stop that act to define the orientation/position of an underside surface and a rear surface of said panel, respectively.

16. The process of claim 15, wherein after said robot places said panel against said rear support/stop of said alignment fixture, suction generation is terminated, but said at least one suction cup remains slidably affixed to said panel via a vacuum existing therebetween.

17. The process of claim 16, further comprising moving said robot and said panel toward said bottom support/stop at least until a corresponding portion of said panel makes contact therewith.

18. The process of claim 17, further comprising subsequently releasing said vacuum between said at least one suction cup and said panel.

19. The process of claim 12, wherein said pushing element is attached to said end effector.

20. The process of claim 12, further comprising a sensor for indicating when said panel has made contact with said position stop.

21. The process of claim 12, wherein said vehicle panel comprises a hood skin.

22. A robotically accomplished vehicle panel orienting/positioning and installation process, comprising:
- providing an alignment fixture for receiving a vehicle panel, said alignment fixture having at least one rear supports/stop and at least one bottom support/stop that define the orientation/position of a panel in two directions when said panel is initially placed on said alignment fixture;
- locating a robot to move said panel between a temporary storage location, said alignment fixture, and a vehicle to which said panel is to be installed;
- attaching an end effector to said robot, said end effector adapted to grasp said panel by using one or more suction cups in communication with a suction generating device;
- using said robot to transfer said panel from said temporary storage location to a position initially against said rear support/stop and above said bottom support/stop of said alignment fixture;
- subsequently terminating suction generation with respect to said one or more suction cups, said one or more suction cups remaining slidably affixed to said panel via a preexisting vacuum therebetween;
- moving said robot and said panel toward said bottom support/stop at least until a corresponding portion of said panel makes contact therewith;
- subsequently releasing said vacuum between said one or more suction cups and said panel;
- using said robot and a pushing element attached thereto to subsequently move said panel against a position stop of said alignment fixture, thereby ensuring the position of said panel in a third direction; and
- using said robot to remove said panel from said alignment fixture and install said panel to said vehicle.

23. The process of claim 22, wherein said alignment fixture is set at a compound angle.

24. The process of claim 23, wherein said alignment fixture is tilted rearward with respect to vertical and also to one side.

25. The process of claim 22, wherein said rear support/stop and said bottom/support stop that act to define the orientation/position of an underside surface and a rear surface of said panel, respectively.

26. The process of claim 22, wherein said pushing element is attached to said end effector.

27. The process of claim 22, further comprising a sensor for indicating when said panel has made contact with said position stop.

28. The process of claim 22, wherein said vehicle panel comprises a hood skin.

29. A vehicle panel alignment process, comprising:
- providing an alignment fixture for receiving a vehicle panel; said alignment fixture including a rear support/stop, a bottom support/stop, and a position stop;
- locating a robot to move said panel between a temporary storage position, said alignment fixture, and a vehicle to which said panel is to be installed;
- once deposited to said alignment fixture by said robot, using said robot to subsequently move said panel against said supports/stops and said position stop of said alignment fixture, thereby defining the orientation/position of said panel in three directions when said panel is initially placed on said alignment fixture; and
- using said robot to move said panel from said alignment fixture to said vehicle.

30. The process of claim 29 further comprising a pushing element attached to said robot and adapted to allow said robot to move said panel against said position stop of said alignment fixture.

* * * * *

UNITED STATES PATENT AND TRADEMARK OFFICE
CERTIFICATE OF CORRECTION

PATENT NO. : 7,587,802 B2 Page 1 of 1
APPLICATION NO. : 11/202873
DATED : September 15, 2009
INVENTOR(S) : Tsuchiya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Twenty-first Day of September, 2010

David J. Kappos
*Director of the United States Patent and Trademark Office*